United States Patent [19]
Fukumoto et al.
[11] Patent Number: 4,821,589
[45] Date of Patent: Apr. 18, 1989

[54] DRIVE UNIT FOR WIRE-TYPE WINDOW

[76] Inventors: Ryoichi Fukumoto, 83, Sone 1-chome, Midori-ku, Nagoya city, Aichi pref.; Daiichi Shiraishi, 81-24, Hatano-cho, Seto city, Aichi pref.; Eiji Iwasaki, 10-4, Misato 1-chome, Toyota city, Aichi pref., all of Japan

[21] Appl. No.: 177,830

[22] Filed: Mar. 18, 1988

Related U.S. Application Data

[63] Continuation of Ser. No. 82,987, Aug. 5, 1987, abandoned, which is a continuation of Ser. No. 741,479, Jun. 5, 1985, abandoned.

[30] Foreign Application Priority Data

Jun. 6, 1984 [JP] Japan ................................ 59-084818
Jun. 6, 1984 [JP] Japan ................................ 59-084819

[51] Int. Cl.[4] ........................ E05F 11/78; F16D 3/68; F16H 7/00

[52] U.S. Cl. ..................................... 74/89.22; 49/349; 49/352; 74/411; 74/505; 464/83; 464/85; 464/93

[58] Field of Search ...................... 74/89.2, 89.22, 411, 74/505; 464/83, 85, 93; 474/94; 49/349, 352

[56] References Cited

U.S. PATENT DOCUMENTS

| | | | |
|---|---|---|---|
| Re. 26,356 | 3/1968 | Pickles | 74/411 |
| 3,789,690 | 2/1974 | Droske | 464/83 |
| 4,034,575 | 7/1977 | Barth | 464/93 |
| 4,216,624 | 8/1980 | Blankenburg et al. | 74/89.2 |
| 4,367,660 | 1/1983 | Becker et al. | 74/411 |
| 4,428,250 | 1/1984 | Becker et al. | 74/89.22 |
| 4,503,719 | 3/1985 | Hamano | 74/411 |
| 4,534,233 | 8/1985 | Hamaguchi | 74/89.15 |

FOREIGN PATENT DOCUMENTS

| | | | |
|---|---|---|---|
| 2911024 | 9/1980 | Fed. Rep. of Germany | 49/349 |
| 49-2336 | 1/1974 | Japan . | |
| 50-26516 | 3/1975 | Japan . | |
| 59-65664 | 4/1984 | Japan | 74/411 |
| 1052767 | 11/1983 | U.S.S.R. | 74/411 |

*Primary Examiner*—Allan D. Herrmann
*Attorney, Agent, or Firm*—Finnegan, Henderson, Farabow, Garrett & Dunner

[57] ABSTRACT

A driver unit for a window regulator or winder for use in an automobile door, for example, includes a gear rotatably mounted on a base and having first and second shafts coaxial with each other and projecting from opposite sides of the gear, the first shaft being rotatably supported on said base, the gear having a support coaxial with the first and second shafts and a plurality of angularly spaced arms projecting radially outwardly from the support. A drum is rotatably mounted on the second shaft and has a plurality of angularly spaced cavities opening toward the support. A plurality of integrally joined dampers are disposed as pairs in the cavities, respectively, with one of the arms being interposed between the dampers in each pair. The gear is rotated by a motor mounted on the base to rotate the drum through the arms and the dampers to move a wire wound on the drum and coupled to the window glass for thereby moving the window glass in the automobile door.

4 Claims, 5 Drawing Sheets

DRIVE UNIT FOR WIRE-TYPE WINDOW

This application is a continuation of application Ser. No. 082,987, filed Aug. 5, 1987, now abandoned, which is a continuation of application Ser. No. 06/741,479 filed June 5, 1985, now abandoned.

BACKGROUND OF THE INVENTION

1. Field of the Invention:

The present invention relates to a wire-type window regulator or winder having a driver unit for rotating a drum to move a wire wound around the drum for lifting and lowering a panel of window glass coupled to the wire to open and close the window, and more particularly to an improved driver unit for use in such a wire-type window regulator.

2. Description of the Prior Art:

One conventional wire-type window regulator or winder is disclosed in Japanese Utility Model Publication No. 49-2336. The disclosed wire-type window regulator has a driver unit as shown in FIG. 1 of the accompanying drawings for moving a wire 10 to lift and lower a panel of window glass to open and close the window. The driver unit includes a shaft 8 rotatably supported on a base 6, a gear 7 and a drum 11 mounted on the shaft 8 in parallel spaced relation and rotatable with the shaft 8, and a motor 1 disposed on the base 6 for rotating the gear 7. As the motor 1 rotates, the gear 7 is rotated to cause the shaft 8 to rotate the drum 11 for thereby moving the wire 10 wound around the drum 11. In the known driver unit, however, the motor 1 and the gear 7 are directly coupled to each other. Therefore, when the motor 1 is forcibly stopped in response to arrival of the window glass at the fully closed or open position, the drum 11 is subjected to a shock due to the inertia of the rotating part of the motor 1. As a result, the wire 10 is unduly tensioned, and the requirement is that the wire 10 should be of a sufficient mechanical strength.

One solution to the above problem has been to use a damper as disclosed in Japanese Laid-Open Utility Model Publication No. 50-26516. As shown in FIG. 2 of the accompanying drawings, the driver unit disclosed in the above Publication No. 50-26516 has a shaft 8 rotatably supported on a base 6, a gear 7 and a follower 11*a* rotatably mounted on the shaft 8 in parallel spaced relation to each other, and a motor 1 for rotating the gear 7. The gear 7 has a recess 7*a* in which there is disposed a damper 12 having an attachment hole 12*a* in which a projection 11*b* of the follower 11*a* engages.

When the gear 7 is rotated by the motor 1, the follower 11*a* is rotated by the gear 7 through the intermediary of the damper 12 and the projection 11*b* to thereby lift or lower the window glass. When the window glass is stopped upon reaching its fully closed or open position, continued rotation of the gear 7 is dampened by the damper 12*a* as it is deformed, and such dampened rotation is transmitted to the follower 11*a*. Where the follower 11*a* comprises a drum 11 as shown in FIG. 3, any tensioning force acting on a wire wound on the drum 11 can be reduced.

With the driver unit shown in FIGS. 2 and 3, the shaft 8 is mounted on the base 6, and the gear 7 and the drum 11 are rotatably supported on the shaft 8. The gear 7 and the drum 11 are increased in thickness in the axial direction of the shaft 8 to provide sufficiently long bearing surfaces 7*c*, 11*c* supported by the shaft 8 for preventing the gear 7 and the drum 11 from wobbling in use. However, the thick gear 8 and drum 11 make the driver unit large in the axial direction of the shaft 8. The driver unit which is large in size is disadvantageous in that it reduces the size of a compartment having a window incorporating the window regulator.

Furthermore, there are a plurality of recesses 7*a* defined in the gear 7, add dampers 12 are disposed respectively in the recesses 7. The follower 11*a* is therefore rotated under a uniform force by the gear 7 through the dampers 12. After the driver unit is assembled, however, the dampers 12 are concealed from external view. Since there would be no wobbling produced between the gear 7 and the follower 11*a* if at least one damper 12 were disposed in one recess 7, it would be impossible to ascertain through visual inspection whether all dampers 12 are assembled in place. If not all dampers 12 were assembled, the dampening ability would be insufficient, failing to reduce the tensioning force which would be imposed on the wire.

SUMMARY OF THE INVENTION

It is an object of the present invention to provide a driver unit for window regulators which is of a small size with a gear rotatably mounted directly on a base.

Still another object of the present invention is to provide a driver unit for window regulators which has integrally joined dampers for simultaneous attachment.

According to the present invention, there is provided a driver unit for use in a window regulator, including a gear rotatably mounted on a base and having first and second shafts coaxial with each other and projecting from opposite sides of the gear, the first shaft being rotatably supported on the base, the gear having a support coaxial with the first and second shafts and a plurality of angularly spaced arms projecting radially outwardly from the support, a drum rotatably mounted on the second shaft and having a plurality of angularly spaced cavities opening toward the support, a plurality of integrally joined dampers disposed as pairs in the cavities, respectively, with one of the arms being interposed between the dampers in each pair, a wire wound around the drum and adapted to be coupled to a panel of window glass, and a driving means mounted on the base for rotating the gear to rotate the drum through the arms and the dampers. Since the gear is mounted directly on the base by the shafts, it is stably supported in position, and is reduced in thickness. The dampers are integrally joined so that they can simultaneously be assembled in place.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
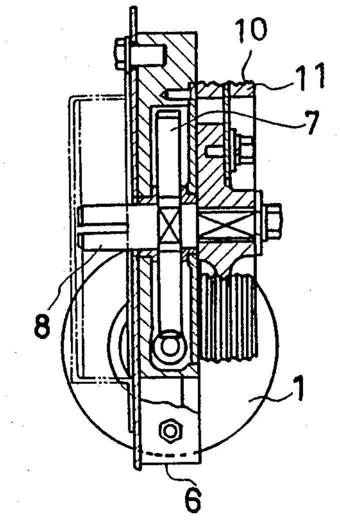
FIG. 1 PRIOR ART
FIG. 1 is a cross-sectional view of a conventional driver unit for a wire-type window regulator.
Figure 2:
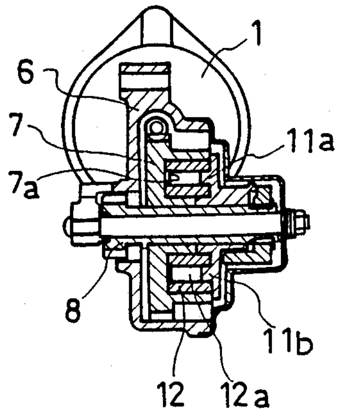
FIG. 2 PRIOR ART
FIG. 2 is a cross-sectional view of another conventional driver unit for a wire-type window regulator.
Figure 3:
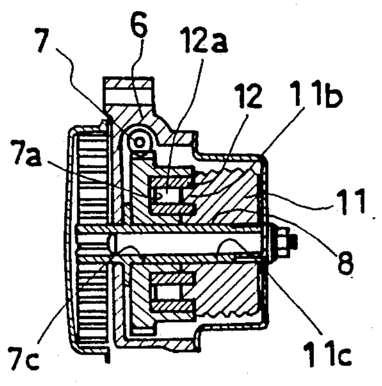
FIG. 3 PRIOR ART
FIG. 3 is a cross-sectional view of a driver unit employing the conventional construction of FIG. 2.
Figure 4:
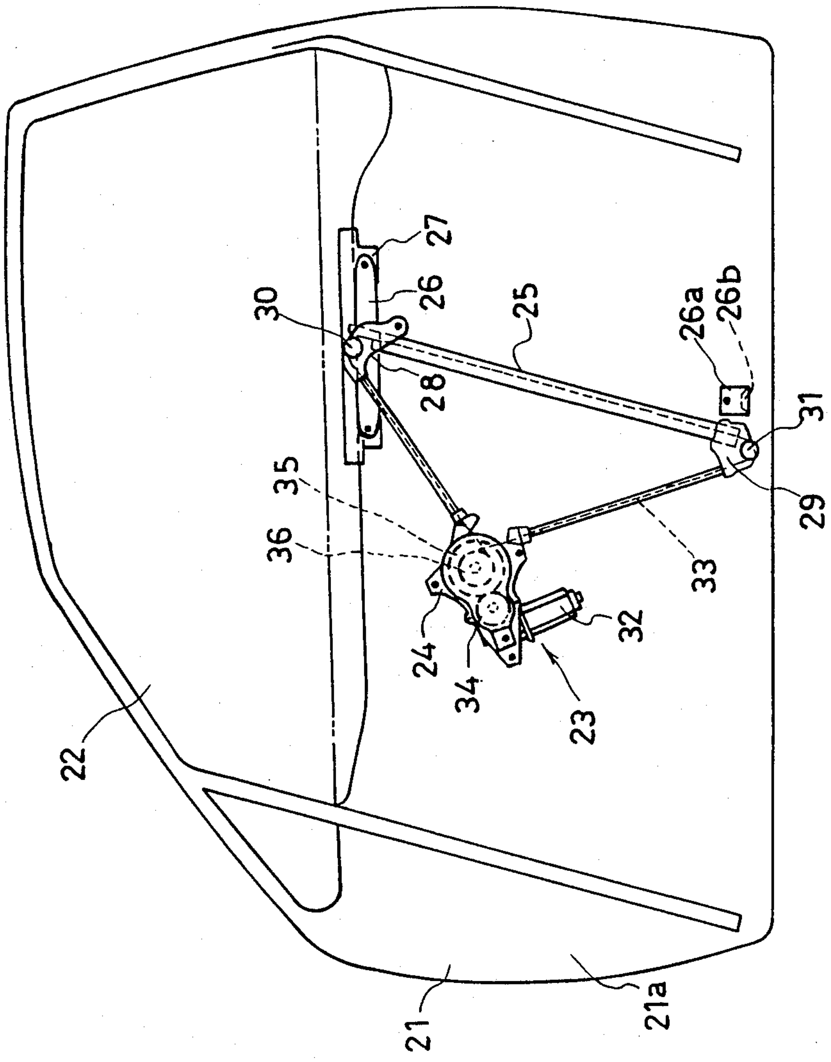
FIG. 4 is a front elevational view of a wire-type window regulator.

A wire-type window regulator or winder for use particularly in an automobile for lifting and lowering a panel of window glass with a wire is illustrated in FIG. 4. The window glass, designated at 22, is vertically movably disposed in a door 21, and the window regulator has a driver unit 23 for moving the wire 33. The driver 23 is supported on a base 24 fixed as by bolts to an inner door panel 21*a*. Designated at 25 is a guide for guiding the vertical movement of a holder 26 engaging a bracket 27 secured to the lower edge of the window glass 22. Attachments 28, 29 are mounted on upper and lower ends of the guide 25 and attached to the inner door panel 21*a*. The wire 33 is guided and trained around pulleys 30, 31 rotatably coupled to the attachments 28, 29, respectively.

A stopper 26*a* limits the downward movement of the window glass 2 in a fully open position in which a cushioning member 26*b* engages the holder 26. The stopper 26*a* is fixed as by a bolt to the inner door panel 21*a*.

The driver unit 23 will be described with reference to FIGS. 5 and 6. The driver unit 23 comprises a driving means or motor 32 fixed to the base 24 and a gear 35 rotatably disposed on the base 24. The gear 35 has outer peripheral teeth 45 held in mesh with the teeth 34*b* of an output gear 34 fixed to the output shaft 34*a* of the motor 32. Therefore, the gear 34 is rotated in response to rotation of the motor 32.

A cover 49 is secured to the base 24, the gear 35 being interposed between the cover 49 and the base 24. The gear 35 has shafts 35*a*, 35*b* projecting coaxially from the opposite sides of the gear 35, the shaft 35*a* being rotatably supported on the base 24 and the shaft 35*b* being rotatably supported on the cover 49. Since the gear 35 is supported by the opposite shafts 35*a*, 35*b*, the gear 35 itself may be reduced in thickness and can effectively be prevented from being tilted. The gear 35 also has a central support 39 coaxial with the shafts 35*a*, 35*b*.

A drum 36 is angularly movably supported on the central support 39 through a bearing surface 41 of the drum 36. The drum 36 has a shaft hole 43 defined in its righthand (FIG. 6) end, the shaft 35*b* of the gear 35 extending through the shaft hole 43 so that the drum 36 is angularly movably supported on the shaft 35*b*. The drum 36 has a helical groove defined in an outer peripheral surface thereof, the wire 33 being wound around the drum 36 in and along the helical groove. The drum 36 also has slots 47, 48 defined in axially opposite surfaces thereof, and the wire 33 has opposite ends 33*a*, 33*b* engaging in the slots 47, 48, respectively.

A spiral spring 37 is housed in a casing 52 fixed to the cover 49 and has a movable end retained in the distal end of the shaft 35*b*.

Figure 8:
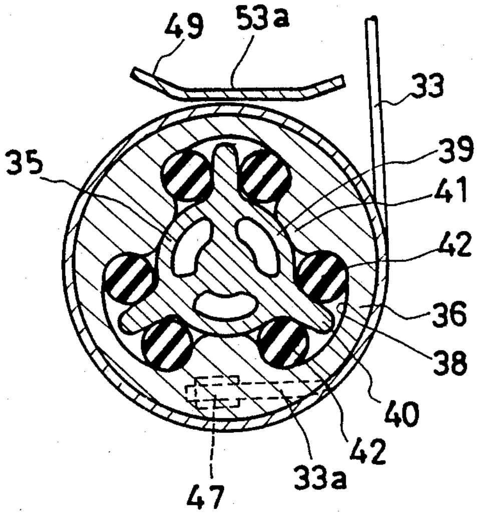
FIG. 8 is a cross-sectional view taken along line VIII—VIII of FIG. 6.

As shown in FIG. 8, the bearing surface 41 of the drum 36 has three cavities 38 at equally spaced angular intervals. A pair of dampers 42 made of a resilient material such as rubber is disposed in each of the cavities 38. The central support 39 of the gear 35 has three equally angularly spaced arms 40 extending radially outwardly, each arm 40 being positioned between one pair of dampers 42.

Figure 9:
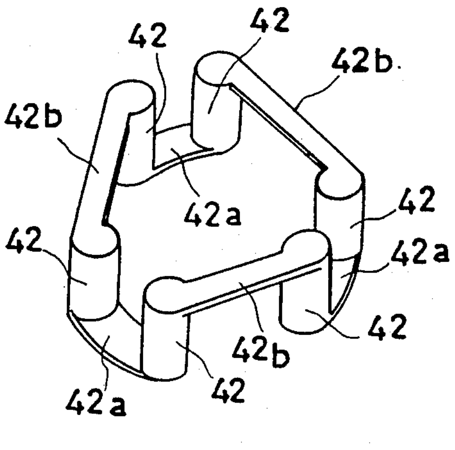
FIG. 9 is a perspective view of a plurality of integrally joined dampers.

As illustrated in FIG. 9, each of the dampers 42 is cylindrical in shape, and each pair of the dampers 42 disposed in one cavity 38 is interconnected by a first bridge 42*a* integrally joined to one end of the dampers 42. The paired dampers 42 are also connected to ones of the adjacent pairs of the dampers 42 by second bridges 42*b* integrally joined to the other end of the dampers 42. Therefore, the dampers 42 are integrally joined and combined in pairs corresponding in position to the respective cavities 38. When the dampers 42 are assembled into the driver unit 23, all of them are simultaneously placed in the cavities 38.

Figure 7:
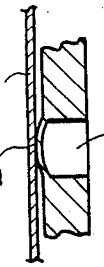
FIG. 7 is an enlarged fragmentary view of a portion of FIG. 6.

The drum 36 has a flange 36*a* adjacent to the open ends of the cavities 38 and held against the side of the gear 38 to support the same. The gear 35 has a number of angularly spaced holes 46 defined axially therein. As shown in FIG. 7, each of the holes 46 has a convex bottom 46*a* engaging the base 24 so that the gear 35 is held in point-to-point contact with the base 24.

Figure 5:
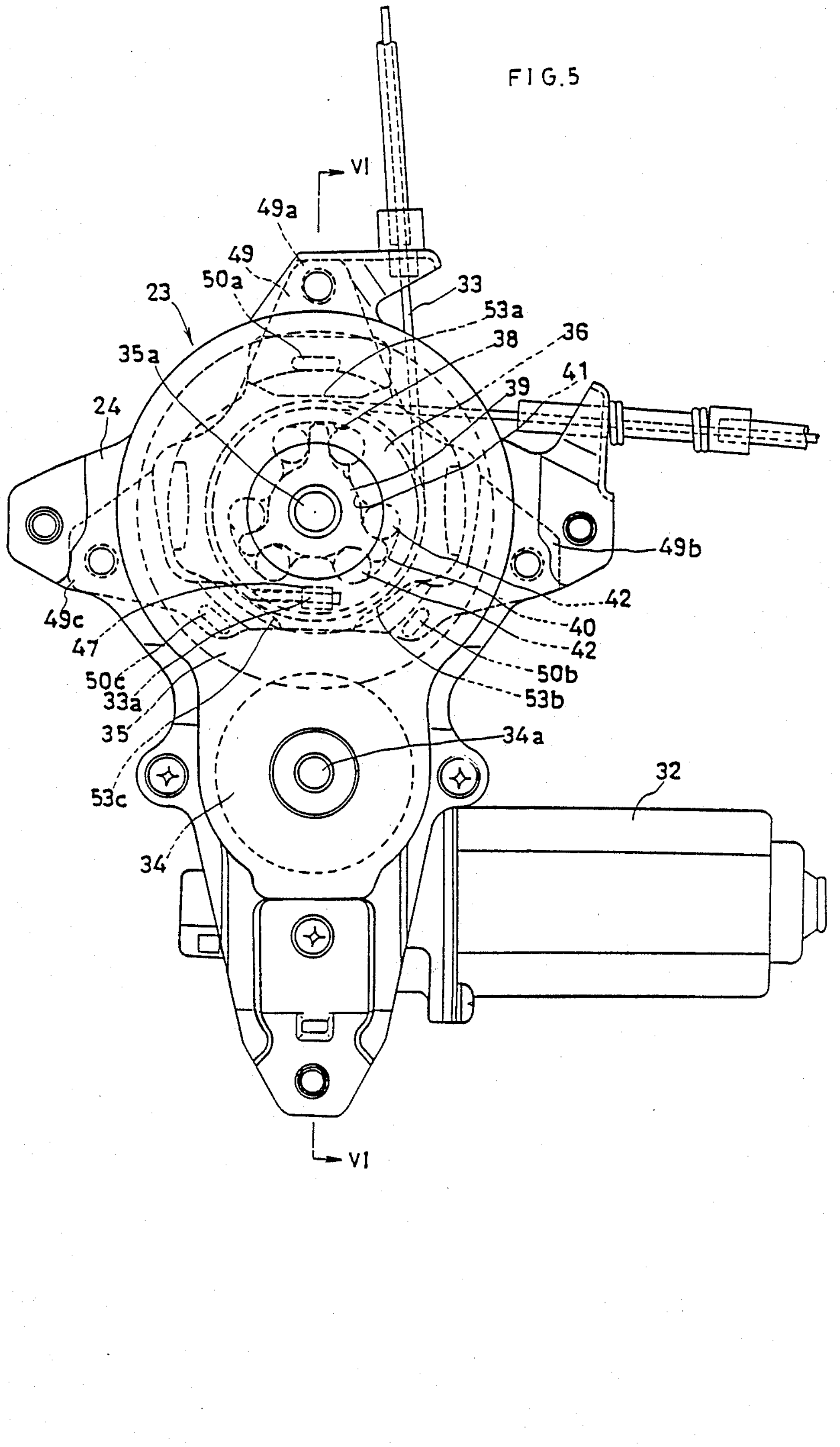
FIG. 5 is a front elevational view of a driver unit according to the present invention.
Figure 6:
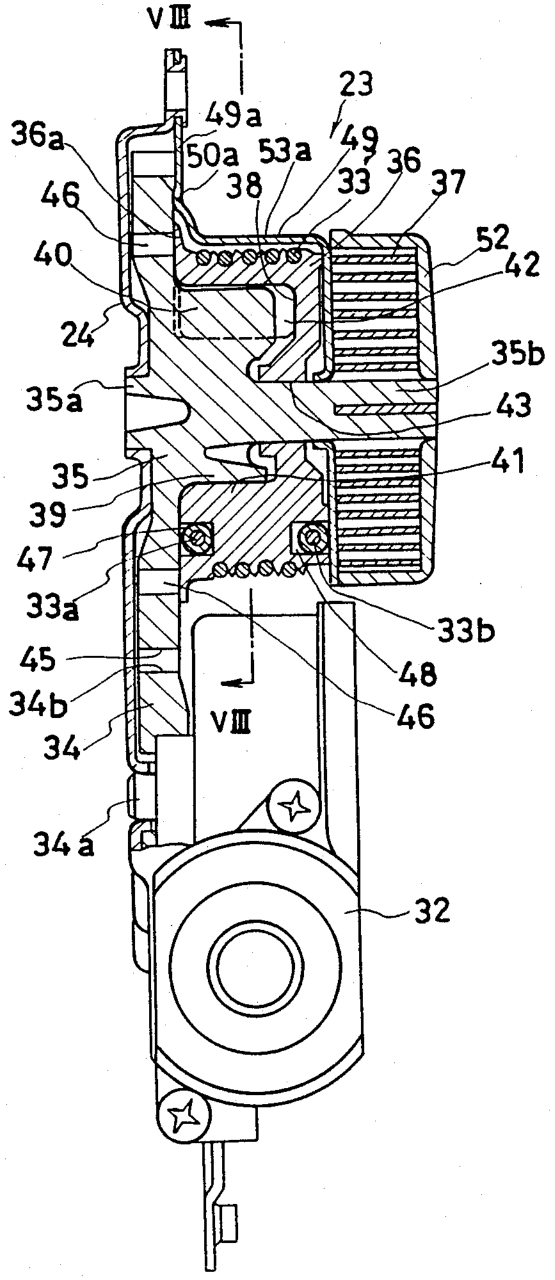
FIG. 6 is a cross-sectional view taken along line VI—VI of FIG. 5.

As shown in FIG. 5, the cover 49 has three angularly spaced attachment flanges 49*a*, 49*b*, 49*c* secured to the base 24. The attachment flanges 49*a*, 49*b*, 49*c* have respective raised portions 50*a*, 50*b*, 50*c* supporting the righthand (FIG. 6) of the gear 35. The cover 49 also has wall surfaces 53*a*, 53*b*, 53*c* disposed adjacent to the outer periphery of the drum 36 for preventing the wire 33 from being displaced out of the helical groove on the drum due to the wire 33 being loosened.

Operation of the driver unit 23 is as follows: When the motor 32 is energized to lift or lower the window glass 22 (FIG. 4), the gear 35 is rotated to rotate the drum 36 through the arms 40 and the dampers 42. The wire 33 wound around the drum 36 is moved lengthwise by the rotating drum 36 to lift or lower the window glass coupled to the wire 33 for thereby closing or opening the window.

When the window glass 22 is lowered to fully open the window, the holder 23 is brought into engagement with the stopper 26*a* (FIG. 4), whereupon the holder 26 is prevented from being moved downwardly and the drum 36 is forcibly stopped against rotation. Then, the dampers 42 are elastically deformed to convert the energy of inertia of the motor armature, the worm (not shown), and the gear 34 into the energy of displacement, and the rotation of the motor is gradually ceased. As a consequence, the wire 33 is prevented from being subject to a shock due to the inertia of the rotating part of the motor 32, and hence is not unduly tensioned.

Although a certain preferred embodiment has been shown and described, it should be understood that many changes and modifications may be made therein without departing from the scope of the appended claims.

We claim

1. A driver unit for use in a window regulator, comprising:

(a) a base;

(b) a gear rotatably mounted on said base and having first and second shafts coaxial with each other, said first and second shafts being formed integrally with said gear and fixed to said gear, said first and second shafts projecting from opposite sides of said gear, said first shaft being rotatably supported on said base, said gear having a support surface coaxial with said first and second shafts and having a plurality of angularly spaced convex arms projecting radially outward from said support surface;

(c) a drum rotatably mounted on said second shaft, said drum having a plurality of angularly spaced cavities opening radially toward said support surface of said gear and a plurality of bearing surfaces supported on said support surface;

(d) a plurality of integrally joined dampers disposed as pairs in each of said cavities, one of said arms being disposed between said dampers in each pair;

(e) a wire wound around said drum and adapted to be coupled to a panel of window glass; and (f) driving means mounted on said base for rotating said gear to rotate said drum through said arms and said dampers.

2. A driver unit according to claim 1, wherein each of said dampers is made of a resilient material and is cylindrical in shape.

3. A driver unit according to claim 2, wherein said dampers in each pair are integrally interconnected by a first bridge joined to one end of the dampers, and connected to ones of the adjacent pairs of the dampers by second bridges joined to the other end of the dampers.

4. A driver unit according to claim 1, wherein said drum has a helical groove defined in an outer peripheral surface thereof, said wire being wound around said drum in and along said helical groove, further including a cover attached to said base with said drum interposed between said base and said cover, said cover having a plurality of wall surfaces disposed adjacent to said outer peripheral surface of the drum for preventing said wire from being displaced out of said helical groove.

* * * * *

UNITED STATES PATENT AND TRADEMARK OFFICE

CERTIFICATE OF CORRECTION

PATENT NO. : 4,821,589

DATED : April 18, 1989

INVENTOR(S) : FUKUMOTO ET AL

It is certified that error appears in the above-identified patent and that said Letters Patent is hereby corrected as shown below:

The title "DRIVE UNIT FOR WIRE-TYPE WINDOW" should be changed to read DRIVE UNIT FOR WIRE-TYPE WINDOW --REGULATORS--.

Signed and Sealed this

Seventh Day of November, 1989

*Attest:*

JEFFREY M. SAMUELS

*Attesting Officer* *Acting Commissioner of Patents and Trademarks*